June 24, 1930.  H. J. MURRAY  1,767,609
SELECTIVE REMOTE CONTROL SYSTEM
Filed Nov. 7, 1927
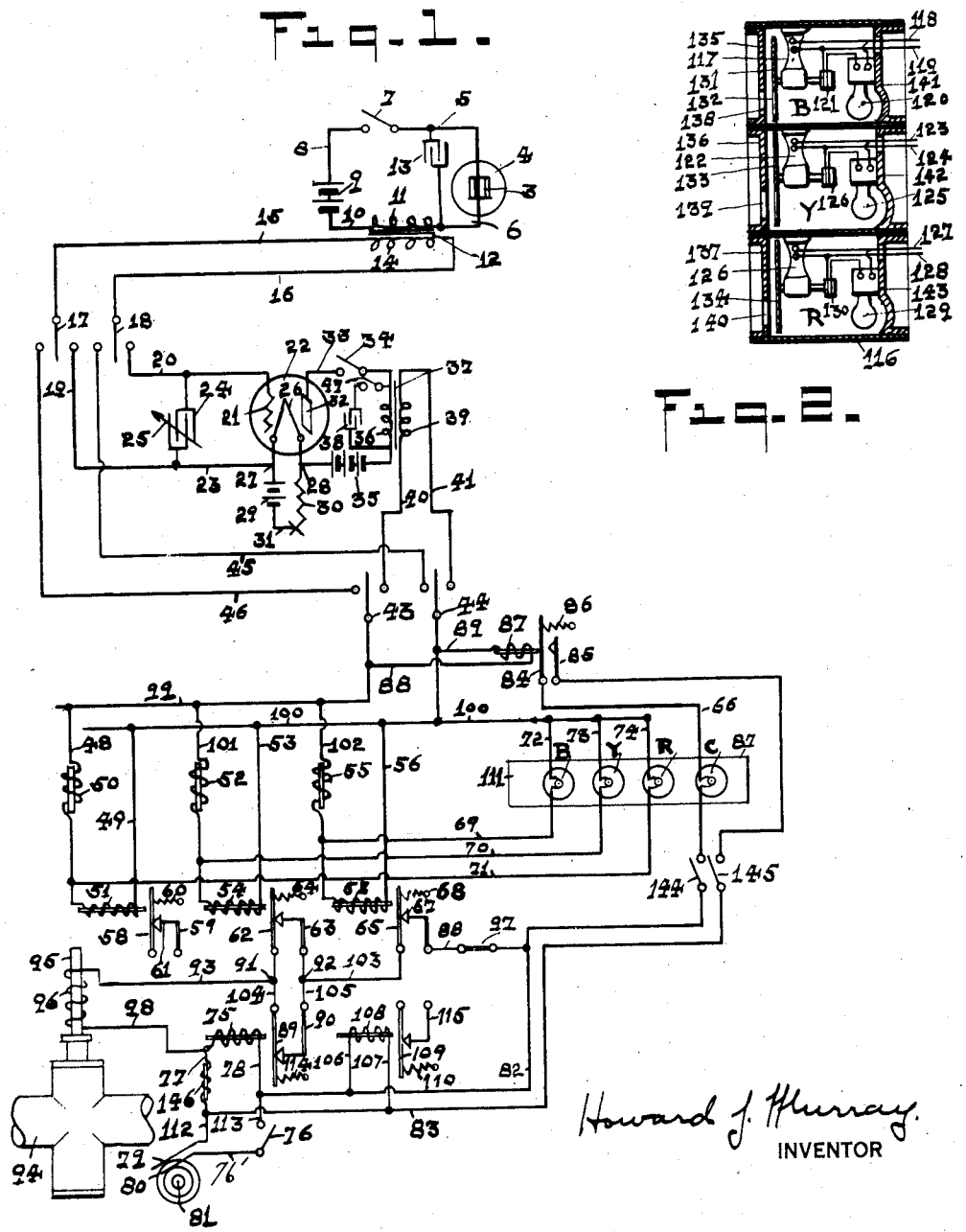

Patented June 24, 1930

1,767,609

UNITED STATES PATENT OFFICE

HOWARD J. MURRAY, OF BROOKLYN, NEW YORK

SELECTIVE REMOTE-CONTROL SYSTEM

Application filed November 7, 1927. Serial No. 231,688.

This invention relates in general to improvements in methods of controlling vehicles by the action of varied light on a light affected circuit organization.

According to the present invention, an interrupted ray of energy is to be employed in such a manner that the said ray will control a light affected circuit organization according to the rate the said ray is interrupted or varied.

One of the objects of my invention is to change the status of a light susceptible circuit organization in approximate synchronism with the interruptions of a ray of energy whereby an alternating current in effect will be caused to flow in certain portions of the said circuit.

Another object of my invention is to provide means designed to selectively interrupt a ray of light at a desired rate so as to cause alternating current to flow in a light susceptible circuit organization, said current to have a frequency corresponding to the said rate of interruption.

Still another object of my invention is to provide means designed to be selectively actuated by certain alternating currents resulting from the action of interrupted light on a light susceptible circuit element.

My invention also contemplates the use of a plurality of rays of energy interrupted singly or together at the same or at different rates, and a plurality of light affected circuit elements arranged to affect the same or different circuits.

My invention still further contemplates the remote control of a movable vehicle by the combined action of alternating currents from a plurality of sources. For example I combine the action of an alternating current having a frequency proportional to the speed of a moving vehicle with the action of an alternating current having a frequency proportional to the rate of interruption of a beam of light. Since two or more beams may be interrupted at different rates at the same time, I am able according to this invention to remotely combine alternating currents of different frequencies corresponding to different rates of light interruption.

In order to describe a theory of action which is believed to underlie the principles of my invention, let it first be assumed that means are provided for supplying and desirably interrupting a ray of radiant energy. Let it further be assumed that a ray affected circuit organization including a ray affected circuit element is movable in the path of and remotely positioned relative to the source of the said ray and its interrupting means. Let it also be assumed that the said circuit organization includes a source of electric power, current amplifying means, portions in which alternating current of a certain frequency cannot flow with sufficient strength to operate a control element, and other portions in which the said current can flow to operate a control element.

Now if the said ray is interrupted regularly at a given rate (say 60 times per second) then the resistance of the said ray affected circuit organization including the said ray affected element will be varied at the same rate. Hence the current flowing from the source of power will also be varied due to the said resistance change, and at the same rate. If this varying current is passed through the primary winding of a transformer it is evident that alternating current in effect will be induced in the secondary winding of the said transformer. This alternating current will have the same frequency as the said rate of ray interruption.

If this rate of ray interruption is changed the frequency of the induced alternating current will accordingly be changed to the same extent. Hence it is possible by means of an interupted or varied ray of energy to selectively convert current at a remote point into alternating current of a desired frequency.

According to this invention this induced alternating current is conducted to a plurality of impedance coils each designed to offer a minimum impedance to a current of a given frequency. Accordingly as the rate of ray interruption is increased from a zero rate to the maximum rate, alternating current will also be induced in the said secondary winding with a corresponding increase of frequency. As the frequency reaches a given predetermined value the said current will selectively flow through the impedance coil designed for the said given value. The invention, then, provides a means of selectively converting current at a remote point.

If suitable relays are placed operatively in the circuits of these individual impedance coils or windings, it is evident that each of these said relays may be selectively actuated by varying the rate of ray interruption. Therefore, according to my invention, it is possible to selectively actuate at a remote point a plurality of circuit elements in any desired sequence, this selective actuation to be effected by interrupting a beam or ray of radiant energy at certain rates.

My invention also contemplates the use of power controlling means operatively associated with said relays, and arranged to be selectively actuated by the said relays.

Various other objects and advantages of my invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:

Fig. 1 is largely a diagrammatic view of the arrangement of means and the necessary electrical connections to properly embody a preferred form of my invention.

Fig. 2 is a sectional view of the means for providing a plurality of beams of radiant energy each having an individual varying rate of intensity.

In the following description and in the claims parts will be identified by specific names for convenience of expression, but they are intended to be as generic in their application to similar parts as the art will permit.

As the invention may be admirably embodied in a remote train control system it will be described in connection with such a device, but it will be obvious that the invention is not so limited, but may be utilized wherever a light sensitive circuit organization may be selectively affected by a periodically varying beam of light.

In the drawings there is illustrated diagrammatically a light sensitive circuit element 3 which may be of the conventional type now known in the art, and inclosed if desired in a vacuous container 4. This element 3 is connected in series with a switch 7, a source of current 9, the primary winding 11 of the transformer 12, and in multiple with the condenser 13. However, according to my invention, these elements may be connected in any other suitable manner to obtain certain desired results.

The secondary winding 14 of transformer 12 is shown connected to double-throw switches 17 and 18 by means of leads 15 and 16. When these switches 17 and 18 are closed to leads 20 and 23, current induced in winding 14 will be led to the grid 21 of the amplifying tube 22. This tube contains the conventional filament 26 heated by current from source 29 and suitably controlled by resistance 30 and wiper 31. The plate 32, switch 34, primary winding 36 of transformer 37, and source of current 35, are shown in the so called plate circuit of the said tube 22. These elements are suitably connected by leads 33 and 28. A condenser 38 is also shown connected to the said secondary winding 36 by means of switch 47. A secondary winding 39 of transformer 37 is connected to leads 40 and 41 ending in the terminals of switches 43 and 44. The leads 45 and 46 from terminals of switches 17 and 18 also terminate at terminals of switches 43 and 44. Hence the amplifying system or the leads 45 and 46 may be made a portion of the control system by the proper use of switches 17, 18, 43, and 44.

The switches 43 and 44 are connected to feeders 99 and 100 supplying current to a plurality of impedance coils 50, 52, and 55. Impedance coil 50 is connected to feeder 99 by lead 48, and supplies current to relay 51 completing the circuit to feeder 100 by lead 49. Impedance coil 52 is connected to feeder 99 by lead 101, and supplies current to relay 54 completing the circuit to feeder 100 by means of lead 53. Impedance coil 55 is connected to feeder 99 by lead 102, and supplies current to relay 57 completing the circuit to feeder 100 by means of lead 56. Associated with relay 51 are armature 58, contact 61, and armature spring 60. Associated with relay 54 are armature 62, and contact 63, and armature spring 64. Associated with relay 57 are armature 65, contact 67, and armature spring 68. Suitably mounted on support 111 is indicator lamp B connected in parallel with relay 57 by lead 69 and to feeder 100 by lead 72. Lamp Y is connected in parallel with relay 54 by lead 70 and to feeder 100 by lead 73. Lamp R is connected in parallel with relay 51 by lead 71 and to feeder 100 by lead 74. Lamp C is connected in parallel with an indicating circuit hereinafter to be described.

There is also shown a current generator 81 preferably of the alternating current type having collector brushes 79 and 80 and supplying current to a plurality of selective relays as 75 and 108 through switch 76 and leads 112 and 113. Relay 75 is connected to leads 112 and 113 by means of leads 77 and 78, and has an armature 89, contact 90, and armature spring 114. Relay 108 is connected to the generator leads by means of leads 106 and 107, and has an armature 109, contact 115, and armature spring 110.

Also taking current from generator 81 is a power control winding 96 having a plunger 95 operatively connected to a conventional valve unit 94 designed to control the supply of power to a movable vehicle. This winding is connected to lead 77 by lead 98 and also by lead 93 to a common connection 91 to armatures 62 and 89. Lead 103 connects armature 65 to contacts 63 and 90 by means of a common lead 82 in the form of conductor 88 and switch 97.

In Fig. 2 there is shown the means for producing the selectively interrupted ray of light assumed to be so positioned that the rays from the said means will be caused to impinge on the light affected circuit element 3 shown in Fig. 1. A casing 116 is provided with a plurality of compartments as B, Y, and R each designed to enclose and support a motor, a light interrupting disc, a source of power, a centrifugal circuit closing device, and the necessary circuit connections. For example, the compartment B encloses a motor 117 suitably attached to the walls of the said compartment and connected to a source of power by means of leads 118 and 119. Also enclosed in this compartment is a disc 131 having suitable openings and a source of light 120. Said light 120 is connected to the motor leads 118 and 119 through a centrifugal circuit closing device 121 mounted on the shaft of the said motor 117 and may be of any conventional type now known in the art. The compartment Y contains a motor 122 connected to a source of power by leads 123 and 124. This compartment Y encloses a source of light 125 connected to the leads of motor 122 through a centrifugal circuit closing device similar to the closing device 126 shown in compartment B. In compartment R there is also a motor 126 connected to a source of power by means of leads 127 and 128. This compartment has a source of light 129 connected to the leads of motor 126 through a centrifugal circuit closing device 130. The motor 117 in compartment B rotates a disc 131 having an opening 132. Similarly the motors 122 and 126 rotate discs having one or more openings. Forming portions of the compartments B, Y, and R are end members 135, 136, and 137 each having apertures as 138, 139, and 140 respectively. The opposite ends of the compartments B, Y, and R are suitably closed by end members 141, 142, and 143 each designed to form a suitable reflector for its mating source of light.

In operation let it be assumed that the casing 116 is a portion of a signalling system for movable vehicles such as railway trains. Let it also be assumed that the power leads 118, 119, 123, 124, 127, and 128 are connected to the said signalling system to function therewith in some desired sequence. Let it still further be assumed that the means in compartment B are operatively associated with the so called blue or green "proceed" signal of the said system. The means in compartment Y are assumed to be associated with the so called amber signal usually designated as the "proceed with caution" signal of the said system. In addition the means in compartment R are considered to be operatively associated with the so called "stop" signal of the said system.

Now if the "proceed" signal of the said system is in operation, current will be supplied to motor 117 of compartment B and hence the motor will start to rotate. The disc 131 attached to the shaft of motor 117 will also be rotated at the same speed. But current cannot flow to lamp 120 until the speed of the motor has reached a desired speed because the centrifugal circuit closing device 121 will not be operated to close the circuit until the said speed is reached by the said motor. In a similar manner the lamps in compartments Y and R will not be lighted until the motors 122 and 126 have reached a desired speed. Hence the beams of light from any of the lamps as 120, 125, and 129 will not be permitted to impinge on the element 3 of Fig. 1 until a proper rate of interruption is attained by the proper disc.

The motors 117, 122, and 126 may be identical as to speed because the rate of interruption may be varied by varying the number of openings in the discs 131, 133, and 134. It is obvious that the motors may also be of the variable speed type, but for the purpose of the description it is assumed that all of the motors are of the single speed type. Hence by means of the elements provided in the compartments B, Y, and R, it is possible to send selectively through the openings 138, 139, and 140 three separate and distinct beams of light. Each of these beams will be interrupted at a desired constant rate due to the openings in the discs as 132 and other openings not shown at the section on the compartments in Fig. 2. Let it also be assumed that the light from the source 120 in compartment B is interrupted at a rate of B times per second by disc 131, that the beam from source 125 is interrupted Y times per second by disc 133, and that the light from source 129 is interrupted R times per second by disc 134.

Now let it be assumed that all of the means shown in Fig. 1 are positioned on a movable vehicle, and that the light sensitive resistance element 3 is positioned in the path of one of the interrupted beams of light sent out by the means shown in Fig. 2. As the interrupted beam of light impinges on the active surface of the said element 3 its resistance will be changed according to the well known and accepted action of light affected resistance changing elements. Accordingly the current flowing in the circuit including the element 3, the source of current 9, and transformer winding 11 will be changed in synchronism with the said light changes, and a uniformly changing or varying current will be caused to flow in the primary winding 11 of the transformer 12. A condenser 13 is also associated with the said element 3 in order to aid in increasing the variation. Therefore an alternating current in effect will be induced in the secondary winding 14 of transformer 12, and this current will be conducted to the double throw switches 17 and 18 by conductors 15 and 16.

By means of these switches a current amplifying unit may be added to or removed from the system. When the switches are closed to conductors 45 and 46 the alternating current is led directly to the switches 43 and 44. When the switches are connected to conductors 20 and 23 the current is led to the grid element 21 of tube 22 and may be additionally varied by changing the status of variable condenser 24. The current may be amplified by any of the known and accepted methods, but I have selected the method shown by Fig. 1 as merely one possible way. It is possible to employ any number of amplifying steps, but I have only shown one in order to avoid a complicated circuit. The filament of tube 22 is heated by current from source 29 controlled by resistance 30 varied by movable contact 31. In the plate circuit the amplified current is led to primary winding 36 of transformer 37 in circuit with the so called B battery 35. The current may be additionally affected by condenser 38 connected to the said transformer winding 36 through the switch 47. The secondary winding 39 of transformer 37 will receive this current as alternating current in effect having the same frequency as the said interrupted beam of light from source 120.

When the switches 43 and 44 are connected to leads 40 and 41 this alternating current will be conducted to busses 99 and 100. Connected to these busses are a plurality of circuits including impedance elements designed to impede alternating currents having certain frequencies. Each of the said elements are designed for different frequencies, preferably in a desired numerical progression. Each of these elements is in circuit with a relay. For example when light from compartment B is projected on the element 3 current will be delivered to the said busses 99 and 100 at a B frequency and will flow through the impedance element 50 and conductor 48 with sufficient strength to operate relay 51. Impedance 52 is designed for a Y frequency, so that when light from source 125 is interrupted at a Y rate by disc 133 a current at Y frequency will flow through conductor 101, impedance 52, and conductor 53 with sufficient strength to operate relay 54. Similarly when light from source 129 is interrupted at an R rate a current will flow through conductor 102, impedance 55, and conductor 65 with sufficient strength to operate relay 57. In passing applicant would state that he is fully aware that a plurality of condensers may be associated with the said impedance coils in order to make the action more sharply defined. He has omitted same in order to simplify the drawings, as this method is old and known in the art of telephony.

Hence I am able to selectively operate by a remote beam of interrupted light any one of the relays 51, 54, and 57. Any number of relays could have been employed as the light affected element 3 can record as many as 40,000 variations of light per second.

I also provide indicating means as lamps B, Y, and R connected to the said impedance elements in order to visibly indicate at a remote point the rate of light interruption from the sources 120, 125, and 129. These lamps could have been shown associated with the relays 51, 54, and 57 to be actuated by other relayed current from another source. Such connection would tend to lessen the load on the busses 99 and 100. The lamp C is so connected, and is employed to indicate when a current is flowing in busses 99 and 100, because the relay 87 is energized by connection to leads 99 and 100 by means of conductors 89 and 88, and will be de-energized when no current is flowing. This will permit the spring 86 to pull away the armature 84 normally in contact with closing element 85 and thus close the circuit of which lamp C is a portion. It is assumed that the switches 144 and 145 have been closed, and that current hereinafter described is flowing in the conductors 82 and 83.

It should now be obvious that with the means as hereinbefore described, I can selectively operate any one of a plurality of circuit closers from a remote point, this selection to be caused by interrupting beams of light of preferably constant intensity. It should also be apparent that these circuit closers can selectively be employed to control a supply of power to a plurality of power receivers, or vary the supply to a single receiver.

Let it be assumed that the valve 94 is a portion of a steam supply system of a locomotive, altho it could obviously be a portion of the air brake system of the locomotive. It may also be a portion of an electric locomotive, or any other type of self moving vehicle. This valve 94 is operated by moving a plunger 95 assumed in this description to be the core of a magnet actuated by current flowing in the winding 96, or by absence of current in the said winding. A generator preferably of the alternating current type as 81 and having collecting brushes 79 and 80, supplies current to leads 76' and 112. This generator is connected to a moving portion 81' of the said vehicle, and is designed to generate current with a frequency proportional to the speed of the vehicle. When switch 76 is closed current will be conducted to relays 75 and 108 by means of conductors 77, 78, 106, and 107. These relays are of the same type as relays 51, 54, and 57, except that they are designed for a stronger current. As this particular description requires only one of these relays, only relay 75 is shown to affect circuit closers associated with the said control system, and relay 108 is shown merely as a matter of record.

I will now describe how the speed of the vehicle may be remotely controlled by the beams of light interrupted as hereinbefore described. Let it be assumed that the B or "proceed" signal of the said system is in operation. According to my invention a current having a B frequency is delivered to the busses 99 and 100. The relay 51 is designed to pass current at this frequency due to the action of impedance 50, and therefore the armature 58 is pulled away from the circuit closer 59. This action may also light lamp R as hereinbefore described, or actuate any other current receiver. In this particular description the action of relay 51 does not affect the power system, and is shown merely for record. The generator 81 is assumed to be generating alternating current of a B frequency. This assumption is proper since the vehicle is permitted to move at a B speed by the B light of the signal system. The impedance 146 is so designed that a current of a B frequency will flow with sufficient strength to operate the relay 75. Consequently as long as the B signal is in operation, and the vehicle is moving at a B speed no action will occur in the said control system. This is true, since the opening of the circuit at armature 89 by action of relay 75 will not affect the circuit including the winding 96, as the contacts 63—64 are still closed.

Now let it be assumed that the said signal system is affected to operate the Y signal and remove the B signal. As hereinbefore described alternating current of a Y frequency will now be delivered to the busses 99 and 100, and relay 54 will be operated to open the circuit at closer 63 by pulling away the armature 62 from the said contact. If the vehicle is still moving at the B speed, the contact 90 is still held away from its armature 89 and consequently current will be cut off from the winding 96, and plunger 95 will therefore be caused to operate the valve of the said speed control element 94 to cause a change of speed of the vehicle. This condition will continue until the speed of the vehicle reaches a Y speed when the current of the generator 81 will then have a Y frequency, and the relay 75 will cease to affect its armature 89 because the impedance 146 will not permit sufficient current to flow to operate the relay 75. Hence the speed control circuit will be closed due to armature 89 moving to contact with element 90 and thus closing the circuit through the winding 96 to affect the plunger 95 and thus permit the flow of power to the vehicle as long as a Y speed is not exceeded. If the Y speed is exceeded the relay 75 will again open the speed control circuit and power will again be cut off. If it is desired to increase the number of steps of control, other relays as 108 may be added. In this event relay 57 would be used to co-operate to maintain the vehicle at a B speed. Therefore the vehicle will be held to the Y speed by the interrupted beams of Y light.

Now assume that the signal system is again affected to operate the R signal and remove the Y signal. Current of R frequency will immediately flow in the busses 99 and 100, and relay 57 will respond to this current due to the action of impedance 55 in permitting current to flow in the windings of this relay 57, and the armature 65 will be pulled away from contact 67. This will open the circuit of the winding 96 without regard to the frequency of the current produced by generator 81 or the speed of the vehicle. It is understood that the current for operating the plunger 95 does not have to be produced by the generator 81, but may be supplied from a battery having no connection with the speed of the vehicle. I have shown only one source of current in order to avoid a complicated circuit diagram.

The action as above described may be reversed. As long as the signal system is set at R or "stop" position the vehicle cannot exceed the R speed in its movement. When the R signal changes to a Y signal the vehicle may be moved up to a Y speed, but if a Y speed is exceeded the relay 75 will cut off the power. When the signal system changes to a B condition then the vehicle may be run at a B speed without any effect from the control system. In general as long as the vehicle is moving at a speed corresponding to a given signal the control system will not affect the supply of power to the vehicle.

It is apparent that my invention may be applied to any desired type of vehicle. For example, vehicles designed to operate on land, water, or in the air may be controlled by a beam of light located and interrupted at a remote point. Two vehicles may be prevented from approaching each other, or one vehicle may be caused to approach another. Also according to my invention it is possible to interrupt reflected light and thus permit a vehicle to be controlled by its own light projected on a remote movable reflector.

In addition it should be noted that a single beam of interrupted light may be employed to remotely control a plurality of vehicles, as for example a lighthouse may affect the movement of a number of ships.

In conclusion I would point out that the device is very positive and definite. For instance the element 3 of Fig. 1 may be placed in the path of several beams of the same intensity. If only one of the said beams is interrupted as hereinbefore described, none of the other beams will cause an alternating current to flow in the control system. The other beams may affect the element 3 to change its resistance, but this effect will not be transferred to the relays as operative alternating current.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In a device of the class described, means forming a portion of a signal system and designed to selectively produce beams of light, means operatively associated with the said light producing means designed to selectively affect the intensity of the said beams at a remote point at a desired uniform rate, light sensitive circuit means positioned at the said remote point to operatively intercept the said affected beams, means constituting a selective circuit organization including the said light sensitive circuit means, a source of power, transformer windings, impedance elements, and selective relays, and speed control means operatively connected to the said relays and designed to control the movement of a vehicle.

2. In a vehicle control system, power means arranged to be selectively actuated by selective relays, two sources of alternating current of selective frequencies operatively associated with the said relays, means constituting one source of alternating current and including a generator designed to produce current alternations proportional to the speed of the said vehicle, means constituting the other alternating current source and including a light sensitive resistance changing element, means providing a ray of interrupted light to impinge on the active surface of the said light sensitive element thereby to vary its resistance at a desired rate and thus in effect produce the said alternating current, and means for selectively affecting the said light source.

3. In a device of the class described, means constituting a light sensitive current varying element, means for moving the said element in the path of a ray of light originating at a remote point at selective rates of periodic intensity, said element arranged to intercept the said ray whereby a current flowing in the said element will be varied at the rate of periodic intensity of the said light, inductive means operatively associated with the said current varying means designed to change the said periodically varying current into alternating current with a frequency proportional to the said rate of periodic intensity, impedance elements operatively associated with the said inductive means designed to selectively permit certain of the said alternating currents to flow in certain of the said impedance elements and certain current indicating elements, means constituting a second source of alternating current providing same at a frequency proportional to the movement of the said light affected element, power controlling means selectively operable by the said permitted currents, and the second named currents, means constituting the source of the said light ray, means for causing the said rate of periodic intensity, and means providing the said current to be varied by the said ray.

4. In a train control system, means constituting a light sensitive current varying element, means for moving the said element in the path of a plurality of rays of light selectively originating at an approximate remote point with selective rates of periodic intensity, said element arranged to intercept a selected ray whereby a current flowing in the said element will be varied at the selected rate of periodic intensity given the said ray, inductive means operatively associated with the said light sensitive current varying means to change the said periodically varying current into alternating with a frequency proportional to the said rate of periodic ray intensity, impedance elements operatively associated with the said inductive means, certain of said impedance elements designed to oppose certain of said alternating currents and to permit certain other alternating currents to selectively flow to power control elements to selectively operate same and thus control the speed of the said train, means providing an alternating current with a frequency proportional to the speed of the said train, a second set of power control elements designed to be selectively actuated by the said speed affected current and arranged to co-operate with the first named power control elements to co-operatively affect the speed of the said train, means constituting the source of the said rays, means for causing the selective rates of periodic intensity, and means providing the said current to be varied.

5. In a device of the class described, the combination of a light source, a beam of light, a light controlling means, a light affected circuit element, a source of current, inductive elements, impedance elements, and power control means, a second source of current, a second set of power control members, means for co-operatively associating the above named means whereby the said power control means are selectively controlled by the said remote light controlling means, and the said second source of current, and means for selectively controlling the said light controlling means.

6. In a train control system, the combination of a plurality of light sources, a plurality of beams of light, a plurality of light controlling means, a light susceptible circuit element, a plurality of current sources, a current amplifying organization, induction elements, impedance elements, and a plurality of train control elements, means for operatively associating the above named means whereby the said train control elements are selectively controlled by the combined action of the said light control means and the speed of the said train, and means for selectively controlling the said light control means.

7. The combination of a movable light susceptible circuit element arranged to intercept an intermittent ray of energy, means designed to selectively control the rate of said intermissions, means constituting a source of current in the circuit including the said light susceptible element, inductive means arranged to be affected by the said current when varied by the said susceptible element, power control means designed to be affected by the co-operative action of the said varied current and a second current provided by the movement of the said element, and means for moving the light susceptible circuit element.

8. In a device of the class described, means providing a beam of light, means for selectively interrupting the said light, means constituting a light susceptible circuit organization positioned to intercept the said light, and means associated with the said circuit means designed to selectively control the speed of a vehicle proportionally to the rate of the said light interruptions.

9. In a train control system, means for selectively producing beams of light, means for selectively interrupting the said beams at various selective rates, means constituting light affected circuit elements movable relative to the said light producing means to intercept said light, means providing a current generator operatively associated with the said train, means including a selective control circuit organization operatively connected to the said light affected circuit elements and said generator, and power controlling means designed to be selectively operated by the said selective control circuit organization.

10. In a vehicle control device, circuit control means designed to be selectively operated by light beams interrupted at a certain rate, means designed to interrupt the said beams at the said rate, means associated with the said circuit means designed to selectively control the speed of a vehicle proportional to the rate of the said light interruptions, and means constituting the source of the said light.

11. In a remote control system, a source of light, a light beam from the said source, means for interrupting the said beam at a desired rate, means providing a remotely positioned light sensitive circuit arranged to intercept the said interrupted light and to have its status changed by a change in the rate of said light interruptions, means associated with the said circuit designed to selectively control the speed of a vehicle proportionally to the rate of the said light interruptions, and indicator means operatively associated with the said circuit thereby to be selectively affected so as to indicate the said status change.

12. In a speed control system, means for creating a plurality of light beams, means for separately changing the intensity of the said beams a given number of times in a given interval of time, means constituting a light sensitive resistance changing circuit element arranged to operatively intercept the said beams to change its resistance thereby at the intensity changing rate, means forming a selective control circuit system operatively associated with the said light sensitive resistance element and means associated with the said circuit means designed to selectively control the speed of a vehicle proportionally to the number of times the intensity of the said beams is changed in a given interval of time.

13. In a remote control system for movable vehicles, the combination of means selectively providing a plurality of rays of radiant energy at selective rates of intermittent intensity, means constituting a remote selective control circuit organization including a ray sensitive resistance changing element, a source of current, inductive means in series with said element and said source of current, other inductive means operatively associated with the first named inductive means, impedance elements designed to be selectively affected by alternating current according to the frequency of the said current and operatively associated with the last named inductive means, circuit controlling relays operatively connected to certain of the said impedance elements to be selectively actuated by current flowing through the said impedance elements, means constituting a second set of circuit controlling relays designed to be actuated by current of a frequency depending on the speed of the said vehicle, means providing the said speed controlled alternating current, power control elements designed to affect the speed of the said vehicle and designed to be actuated by current controlled by the combined action of both sets of the above named relays, and means for suitably positioning the said rays thereby to impinge on the said sensitive element as it is moved relative to the said ray producing means.

14. In a movable remote controlled selective current convertor, the combination of a circuit organization including a light affected resistance changing circuit element, a source of current, and a transformer winding, means designed to project beams of light at selective rates of interruption on the active surface of the said element thereby to vary the said current at desired selective frequencies in the said transformer winding, means constituting a second transformer winding inductively associated with the first named winding whereby the said current variations will in effect become alternating current of a frequency depending on the selected rate of light interruption, means providing alternating current of a frequency proportional to the movement of the said convertor, and means for co-operatively employing the said so-called light current and the said so-called movement current thereby to control the movement of the said convertor.

15. In a selective remote control device, means designed to project for selective intervals of time an intermittent beam of light to a remote point, means position at the said remote point designed to vary the status of a circuit organization when affected by said intermittent light, control means operatively connected to the said circuit and designed to be selectively affected by a change in the said selective intermittent time rate of light projection, other control means operatively connected in circuit with a moving member thereby to be selectively affected proportionally to the movement of said member, and means for co-operatively associating both the first named and the second named control means thereby to control the speed of the said moving member according to the said intermittent time rate of light projection.

16. In a remotely movable selective light controlled system, the combination of a light affected circuit element, a source of current, inductive windings, impedance winding, switches, condensers, relays, a second source of alternating current of a frequency depending on the speed of the said movable system, and magnetically actuated control elements, means for connecting the above named means in a desired circuit organization thereby to control the speed of the said system, and means for positioning the said light affected circuit element relative to a beam of light.

17. In a selective remote control system for movable vehicles, the combination of means selectively providing a plurality of beams of light at desired rates of intermittent intensity, means constituting a remote selective control system including a light affected circuit element, a source of current, inductive means in series with said element and said source of current, a second inductive means operatively associated with the first named inductive means, impedance means designed to be selectively affected by the alternating current induced in the second named inductive means, circuit controlling relays operatively connected to certain of the said impedance elements thereby to be selectively actuated by the certain alternating current flowing through certain of the said impedance means, additional relays actuated by alternating current with a frequency proportional to the speed of the said vehicle and arranged to co-operate with the first named relays thereby to control the speed of the said vehicle, means designed to produce the said speed affected alternating current constituting a generator attached to a moving part of the said vehicle, means constituting power control elements arranged to affect the movement of the said vehicle, said power control elements actuated by current in circuits controlled by the combined action of the above named relays, and means for suitably positioning the said light affected element in the path of the said beam as it is moved relative to the said source of the said beam.

HOWARD J. MURRAY.